2 Sheets—Sheet 2.
A. Q. ROSS.
Gas-Retort Discharging Apparatus.
No. 212,569. Patented Feb. 25, 1879.
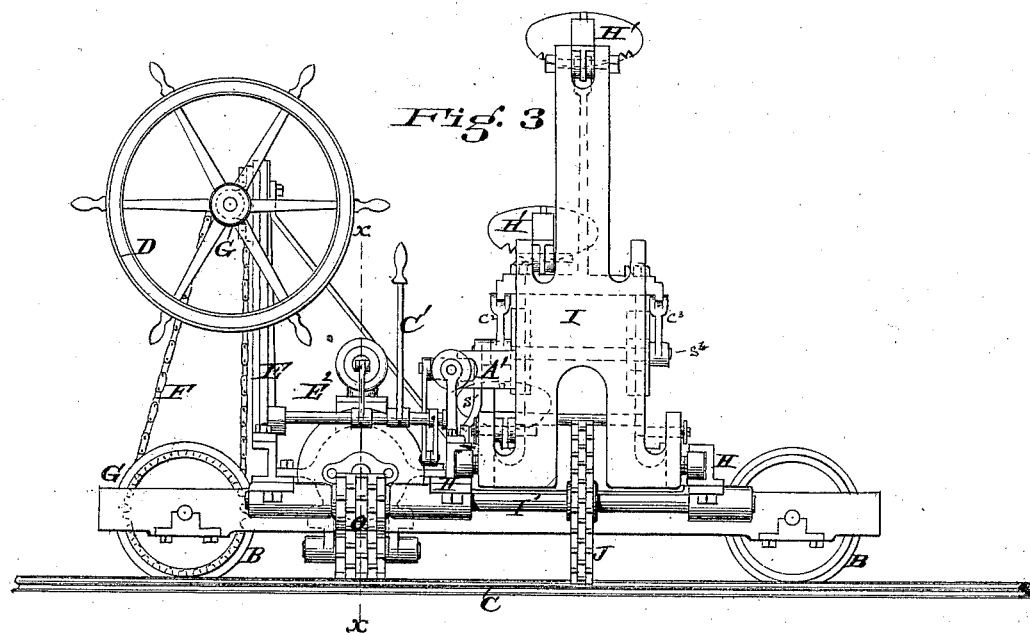
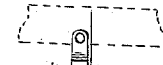
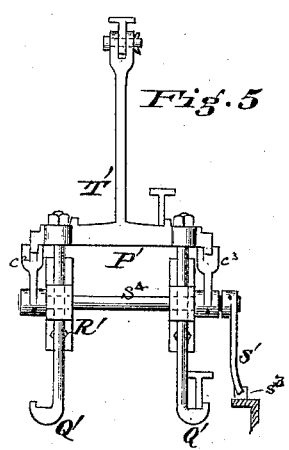
Attest
Edgar J. Ross
John E. Jones
Inventor
Abbott Q. Ross
By Ellsworth & Millward
his Attorneys

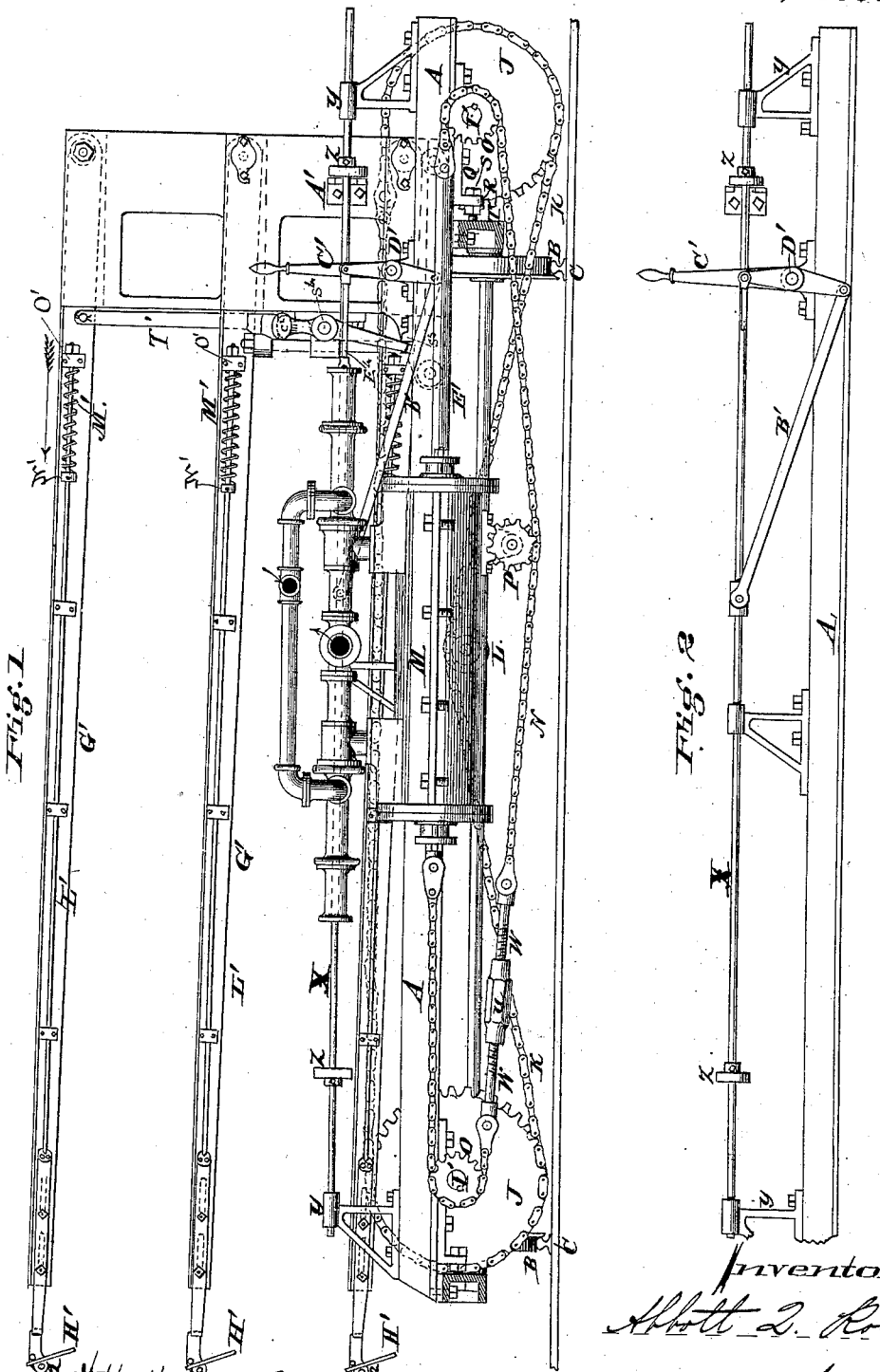

UNITED STATES PATENT OFFICE.

ABBOTT Q. ROSS, OF CINCINNATI, OHIO.

IMPROVEMENT IN GAS-RETORT-DISCHARGING APPARATUS.

Specification forming part of Letters Patent No. 212,569, dated February 25, 1879; application filed June 27, 1878.

*To all whom it may concern:*

Be it known that I, ABBOTT Q. ROSS, of Cincinnati, in the county of Hamilton and State of Ohio, have invented certain new and useful Improvements in Apparatus for Discharging Gas-Retorts, of which the following is a specification, reference being had to the accompanying drawings, in which—

Figure 1 is a sectional elevation of the apparatus, taken on the line $xx$, Fig. 3. Fig. 2 is a detail view of the rake-reversing rod, levers, and tripping device. Fig. 3 is a rear-end elevation, and Fig. 4 represents detail views, of the rake lifting mechanism. Fig. 5 is another view of the same. Fig. 6 represents detailed views of the rake-heads, showing the ends $J'$ of the rake-handles.

My invention has for its object to provide an improved machine for discharging gas-retorts in a rapid and thorough manner; and to this end it consists, first, in a gang of rakes mounted upon a reciprocating carriage, which, in its turn, is adapted to be moved along a track in front of a bench of retorts, and provided with a hydraulic engine of peculiar construction, by which the rake-carriage is fed forward to insert the rakes within the retorts, and to be retracted for discharging the contents thereof.

It also consists in the two lower rakes of the carriage, constructed so as to be shifted from side to side for discharging the right and left hand retorts of a bench.

It also consists in the automatic rakes, constructed and adapted to be lifted for insertion within the retorts, so as to enter above the coke and to be automatically thrown down with the retorts behind the coke into the proper position for discharging the latter.

It also consists in the method of hinging the rakes to the rake-beams.

It also consists in the rakes provided with compensating mechanism, by which they are adapted to varying lengths of retorts in a bench, whereby when one or two rakes are entering the longest retorts the remaining rake or rakes within the shorter retorts coming against the back ends thereof shall yield, and thus prevent injury to such ends.

It also consists in the rake-shifting mechanism, by which the rakes within the retorts are dropped behind the coke at the instant the supply of power is cut off, and after discharging the coke are thrown upward into the proper positions for again entering the retorts when the rake-carriage has reached the limit of its backward movement, whereby the supply of power is again cut off.

It also consists in the mechanism for reciprocating the rake-carriage upon the tracks.

It also consists in the means for adjusting the feeding chains or devices of the carriage, to shorten or lengthen the same, and compensate for the wear of their parts.

In the accompanying drawings, A is the truck-frame, mounted upon wheels B, and adapted to be fed along upon a track, C, in front of a bench of gas-retorts by means of a hand-wheel, D, mounted upon a standard, E, and an open chain, F, engaging with sprocket-wheels G G on one of the truck-axles and the shaft of the hand-wheel.

The truck-frame is provided with two longitudinal guideways, H H, upon which the rake-carriage I is mounted, and carries at or near each end a cross-shaft, $P^1 P^4$, each having a large sprocket or chain wheel, J, between the guideways. These sprocket-wheels carry an endless chain, K, securely fastened at one point to the rake-carriage, and passing over an idle-pulley, L, under the truck-frame, by which the slack is sustained above the ground or floor.

When the sprocket-wheels are rotated the chain feeds the rake-carriage forward and back upon its ways.

To properly guide the rake-carriage and prevent it from tipping or becoming displaced, the ways are made with longitudinal grooves in their proximate faces to receive the wheels of the carriage, the lower flange of the ways supporting the wheels, and the upper flange preventing them from rising out of place.

M is the hydraulic engine, of the usual or any preferred construction, also mounted upon the truck about midway thereof, and at the side of the guideways. It is provided with the usual induction and exhaust ports, and receives its supply of water from a pump in the retort-house or directly from the water-mains by suitable pipes.

The piston-rod $E^1$ of the cylinder is secured at its ends to a second chain, N, which passes around small sprocket-wheels or rollers O O, mounted upon the shafts, which carry the large sprocket-wheels, and the chain is held out of contact with the lower side of the cylinder in proper working position by a small sprocket-wheel or roller, P, having its bearings under the truck. When the piston is reciprocated within the cylinder it causes the chain N to turn the shafts $I^1 I^1$, which in their turn rotate the large sprocket-wheels, so that the chain K shall move the rake-carriage back and forth upon its ways.

The diameter of the large sprocket-wheel is proportioned to the stroke of the piston, so as to move a sufficient distance for feeding the rakes into the retorts the entire length of the latter. The carriage should travel about twelve feet, and the stroke of the piston should therefore be about three feet. Any other relative proportion, however, may be adopted, according to the distance the rake-carriage must travel. To tighten or loosen the chain K, the rear shaft of the truck is hung in slotted boxes Q, which are provided with a strong end flange, R, through which pass adjusting-screws S, with their points against the boxes of the truck axles, as shown in Fig. 1. When the screws have been operated to set the shaft and adjust the tension of the chain, they are locked in position by the jam-nut T bearing against the flange, as shown.

The chain N is also adapted for adjustment for a like purpose; but this is effected by a right-and-left nut or thimble, U, working upon right and left screw-bolts W W, interposed in the chain, as shown in Fig. 1.

The mechanism for automatically cutting off the supply of water from the engine when the carriage has reached the limit of its forward and backward movements is constructed and operates as follows: X is a long rod, held and sliding within standards $y\ y$ upon the truck-frame slide or upon the guideways, and provided with stops $z\ z$ near each end, against which a lateral arm, A', on the rake-carriage impinges near the end of each forward and backward movement to move the rod or set the rakes. The rod is connected near the center by a bar, B', to the lower arm of a shifting or starting lever, C', pivoted at D' to the truck-frame; and the outer end of the valve-stem $E^4$ is also connected by a rod, $E^2$, to the shifting-lever above its pivot D'. When the carriage is to be moved forward to insert the rakes within the retorts, the starting-lever is thrown forward in the direction of the arrow, thereby, through the medium of the connecting-bar B', pulling back the long rod X until a boss near its rear end comes in contact with the rear standard and arrests the further movement of the rod in that direction. The same movement of the shifting-lever impels the valve-stem by the connecting-rod $E^2$ to set the valves for the induction of water to the cylinder, so that the piston shall travel forward and move forward the rake-carriage.

When the carriage has nearly reached the end of its movement its side arm, A', encounters the forward stop on the rod X and moves the latter forward the remaining distance the carriage has to travel. This movement of the rod again shifts the valves into a position to cut off the water from the cylinder at the instant the carriage stops. Now, to start the carriage on its return movement, the shifting-lever is again operated and pulled back, and sets the valves for the induction of water to the cylinder, and when the carriage has nearly reached the end of its backward movement its side arm strikes the rear stop on the rod, and the latter is carried back until the carriage stops, thereby again cutting off the supply of water until the carriage is ready to be moved forward again.

Thus, it will be seen, the supply of water is automatically cut off from the cylinder at the end of each movement of the carrriage, and that the starting-lever is only employed to shift the valves for letting on the supply of water for moving the carriage.

G' are the rake-beams, three in number, being shown in this instance pivoted at their rear ends within the carriage, so as to rise and fall, and they are arranged one above another, in order that they shall be on a line with the retorts they are to enter. H' are the rakes, made in the form of oblong toothed plates, provided upon their backs with a boss or eye-shank, $I^2$, which is pivoted to the end of the rake-arms, so that the rake shall lie back of such end. By this construction and means of hinging the rakes they will ride freely over the top of the coke when the rakes are inserted in the retorts, and will drop down behind the coke with a certainty of action when they reach the back end of the retorts. When they are dropped down into raking position their upper ends or edges above the hinge come in contact with stops K' on the rake-arm, which hold them in the proper working position, as shown in Fig. 1—that is to say, nearly at right angles to the beams.

The rake-arms are slotted vertically to receive the ends of the rake-beams, and the latter are slotted laterally to receive the bolts by which the arms are held in place. The rake-arms are also provided upon one or both sides of the beams with long rods L', which lie within guide-loops along the sides of the beams, and carry coiled or spiral springs M' between a boss, N', on the rods and the rear guide, O', on the beams. These springs exert their tensions to hold forward the rods and rakes, the bolts and the slots in the beams permitting the rods to move freely. By this provision the rakes will yield or move back readily when they touch the back ends of the retorts, and therefore, if one or more retorts are shorter than the others, the contact of the rakes with their rear ends will not injure or break at such ends.

P' is a cross-bar of the carriage, upon which the intermediate rake-beam rests, and it is provided with pendent hooks Q', which support the lower rake-beam. The hooks are held within vertical guides R′, secured to the front of the carriage, and the end of the cross-bar rests upon two cams, $c^2$ $c^2$, secured to a shaft, $s^4$, carrying a tripping-lever, $s^1$, so that its lower end shall lie within the path of stops $s^2$ and $s^3$ on the truck-frame or guideways. The cross-bar also carries an upright, T′, whose upper end is pivoted to the upper beam, L′, in front of the carriage, as shown in Fig. 1. These devices are for the purpose of holding the rake-beams until they have entered and reached the rear ends of the retorts, when the tripping-lever $s^1$ strikes a stop, $s^2$, on the carriage, thereby throwing it out from under the cross-bar, and allowing the beams to drop upon the coke and the rakes to drop behind the coke in the retort. This continues until the charges are withdrawn from the retorts and the carriage reaches the rear end of the track, when the tripping-lever strikes a stop, $s^3$, on the track or guideway, and is again thrown under the cross-bar to lift the rakes, as will be readily understood without further description.

In operating the rakes they are arranged on one side of the carriage to enter three retorts of the bench to discharge the coke, after which the two lower rake-beams are shifted to the opposite side of the carriage, resting upon the cross-bar and hooks, to enter and discharge the contents of the other three retorts of the bench.

If desired, there may be as many rakes as there are retorts in a bench; but, according to the present mode of charging and discharging gas-retorts, three rakes are all that are required for a gang.

By pivoting the rake-beams to the carriage they are permitted to rise and fall freely in riding over the coke within the retorts, and over inequalities in the floor of the retorts in discharging their contents.

Having now fully described my invention, what I claim is—

1. In combination with an automatic discharging-rake, which is advanced and retired by a hydraulic engine, the mechanism, substantially as shown, for automatically stopping and reversing the motion of the rake at the end of the stroke, substantially as described.

2. The combination of a reciprocating carriage carrying one or more rakes and a sliding rod, X, on the supporting-truck, connected with the valve mechanism of the engine, substantially as and for the purpose described.

3. The combination of the shifting or starting lever with the valve-stem and sliding rod X, to set the valves for the induction and eduction of the water, and to shift the rod to receive the action of the rake-carriage for shutting off the supply of water at the end of each movement of the carriage, substantially as described.

4. The gang of rakes hinged to a reciprocating carriage, combined with a supporting-frame, T′, cams $c^2$ $c^3$, lever S′, and stops $s^2$ $s^3$, whereby said rakes are automatically raised and lowered at each termination of its reciprocation.

5. The combination of the cross-bar P′, pendent hooks Q′, upright T′, tripping-lever S′, and cams $c^2$ $c^3$ with the traveling carriage and rake-beams, substantially as and for the purpose specified.

6. The rakes hinged at their backs to the ends of the rake-arms, substantially as described, for the purpose specified.

7. A rake for the beams of a gas-retort-discharging apparatus provided with a hinge upon its back, whereby the rake is jointed to the rake-arm, substantially as described.

8. The combination of the stops K′ with the rakes and rake-arms, substantially as described, for the purpose specified.

9. The slotted rake-arms supported upon their beams by the sliding spring-rods L′ and by bolts working through longitudinal slots in the beams, substantially as described, for the purpose specified.

10. The reciprocating rake-carriage, constructed as described, to receive the gang of rakes and their beams, and provided with the mechanism shown, whereby the two lower beams can be shifted to opposite sides of the carriage and to opposite sides of the upper rake-beam, substantially as described, for the purpose specified.

11. An automatic discharging-rake constructed to enter a retort, and provided with a longitudinally-acting spring, situated between the rake and rake-carriage, for the purpose of preventing injury to the rake or the retorts when the rake is forced into the retort and of allowing the rake to yield and slide toward the carriage, substantially as described.

In testimony of which invention I hereunto set my hand.

ABBOTT Q. ROSS.

Witnesses:
JOHN E. JONES,
E. A. ELLSWORTH.